United States Patent [19]

DeSantis

[11] Patent Number: 4,722,169

[45] Date of Patent: Feb. 2, 1988

[54] PARTS SENSOR FOR CONVEYOR APPARATUS

[75] Inventor: Raymond P. DeSantis, Troy, Mich.

[73] Assignee: PTX-Pentronix, Inc., Lincoln Park, Mich.

[21] Appl. No.: 827,771

[22] Filed: Feb. 7, 1986

Related U.S. Application Data

[63] Continuation-in-part of Ser. No. 479,279, Mar. 28, 1983, Pat. No. 4,569,183, which is a continuation-in-part of Ser. No. 456,166, Feb. 9, 1983, Pat. No. 4,550,551.

[51] Int. Cl.$^4$ .............................................. B65B 23/22
[52] U.S. Cl. ....................................... 53/494; 53/150; 53/251; 53/475; 53/504; 53/534
[58] Field of Search .................. 53/57, 56, 55, 494, 53/500, 504, 534, 251, 250, 539, 150, 148, 473–475; 209/586

[56] References Cited

U.S. PATENT DOCUMENTS

| | | | |
|---|---|---|---|
| 3,837,486 | 9/1974 | Gardner | 209/586 X |
| 3,879,920 | 4/1975 | Langen | 53/55 X |
| 4,051,652 | 10/1977 | Hirano et al. | 53/539 X |
| 4,115,982 | 9/1978 | Sato et al. | 53/534 |
| 4,365,705 | 12/1982 | Zinck et al. | 53/534 X |
| 4,457,622 | 7/1984 | Kato et al. | 209/586 X |
| 4,462,201 | 7/1984 | Nambu | 53/251 X |

Primary Examiner—James F. Coan
Attorney, Agent, or Firm—Gifford, Groh, VanOphem, Sheridan, Sprinkle and Dolgorukov

[57] ABSTRACT

An apparatus and method for transferring elongated parts, such as spark plug insulator bodies, travelling in a single row, end to end, on a first conveyor to a receptacle travelling on a second conveyor, the parts being placed each in a part-holding cavity in an insert in the receptacle, the part-holding cavity being disposed in consecutive rows. A part pick-up member picks up parts one at a time at the end of the first conveyor and transfers each part to the receptacle in which the part is placed substantially vertically with its end in a part-holding cavity in the insert. Sensors distinguish between good and defective parts at the location where the parts are picked up at the end of the first conveyor such that defective parts are rejected and the part pick-up member picks up only non-defective parts. Sensors detect fallen-over parts in the receptacle and stop loading in the event that parts are not properly placed in the holding cavities in the receptacle insert. The operation of the apparatus is under the control of a programmed logic processor controller.

16 Claims, 12 Drawing Figures

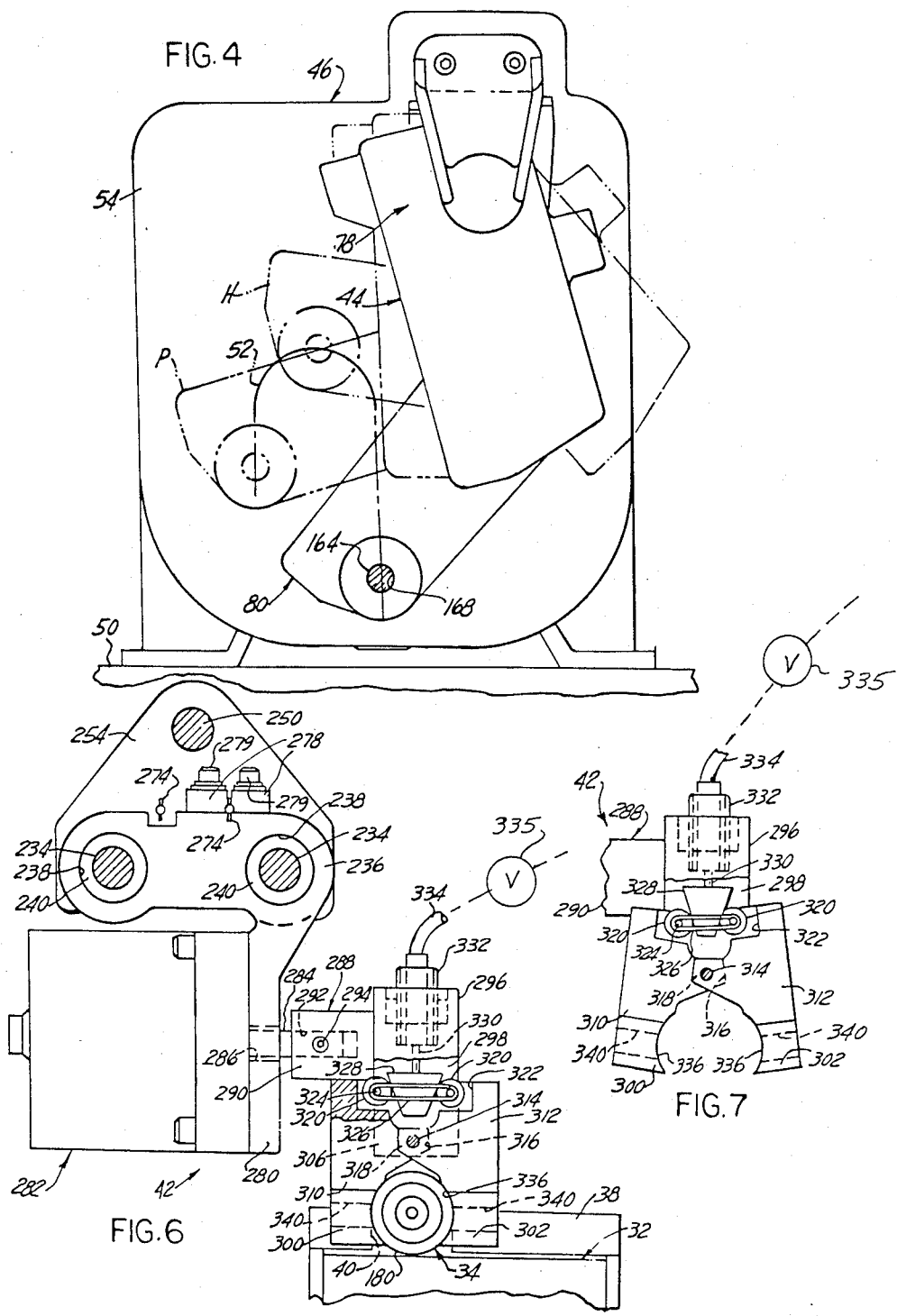

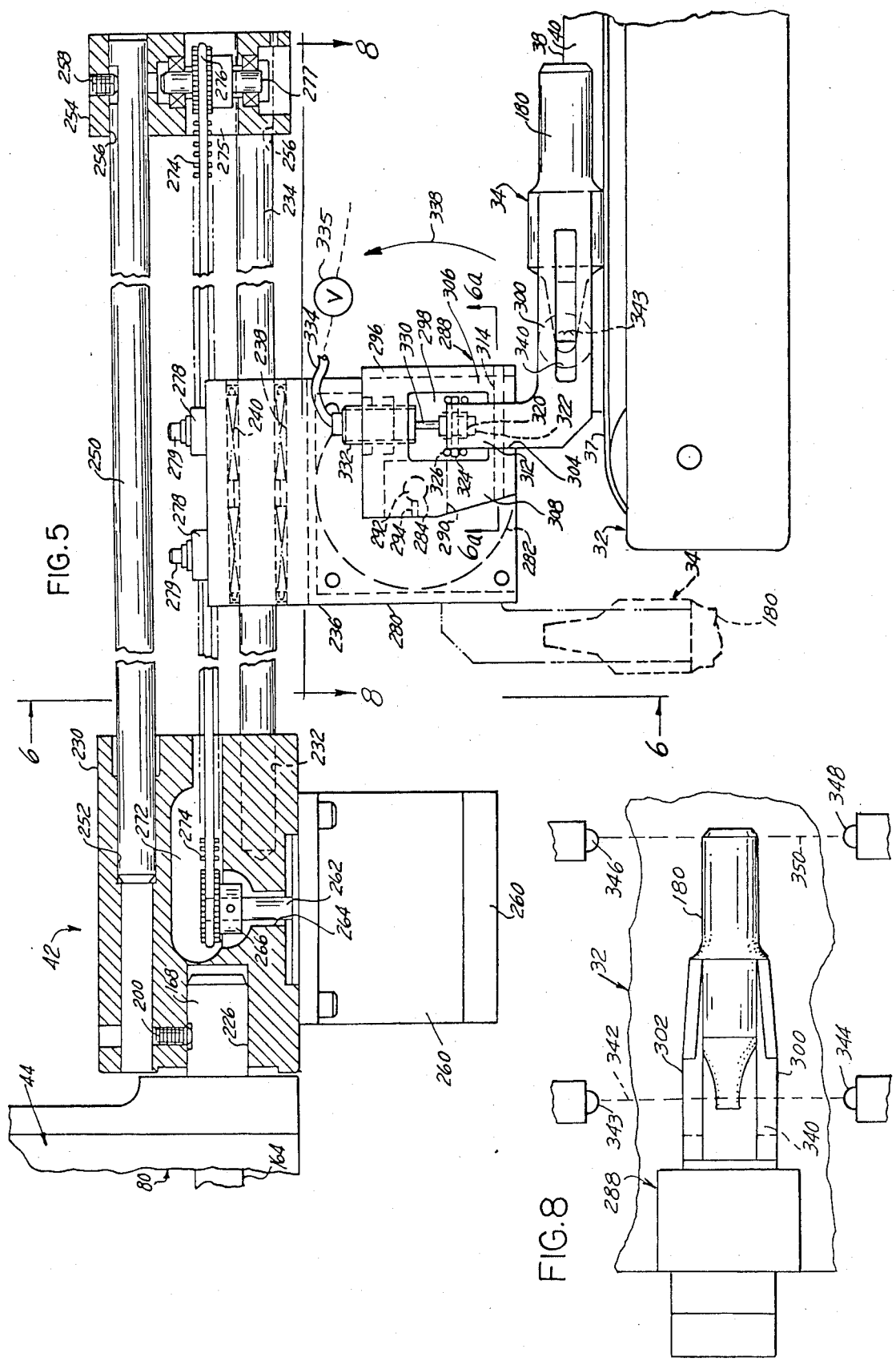

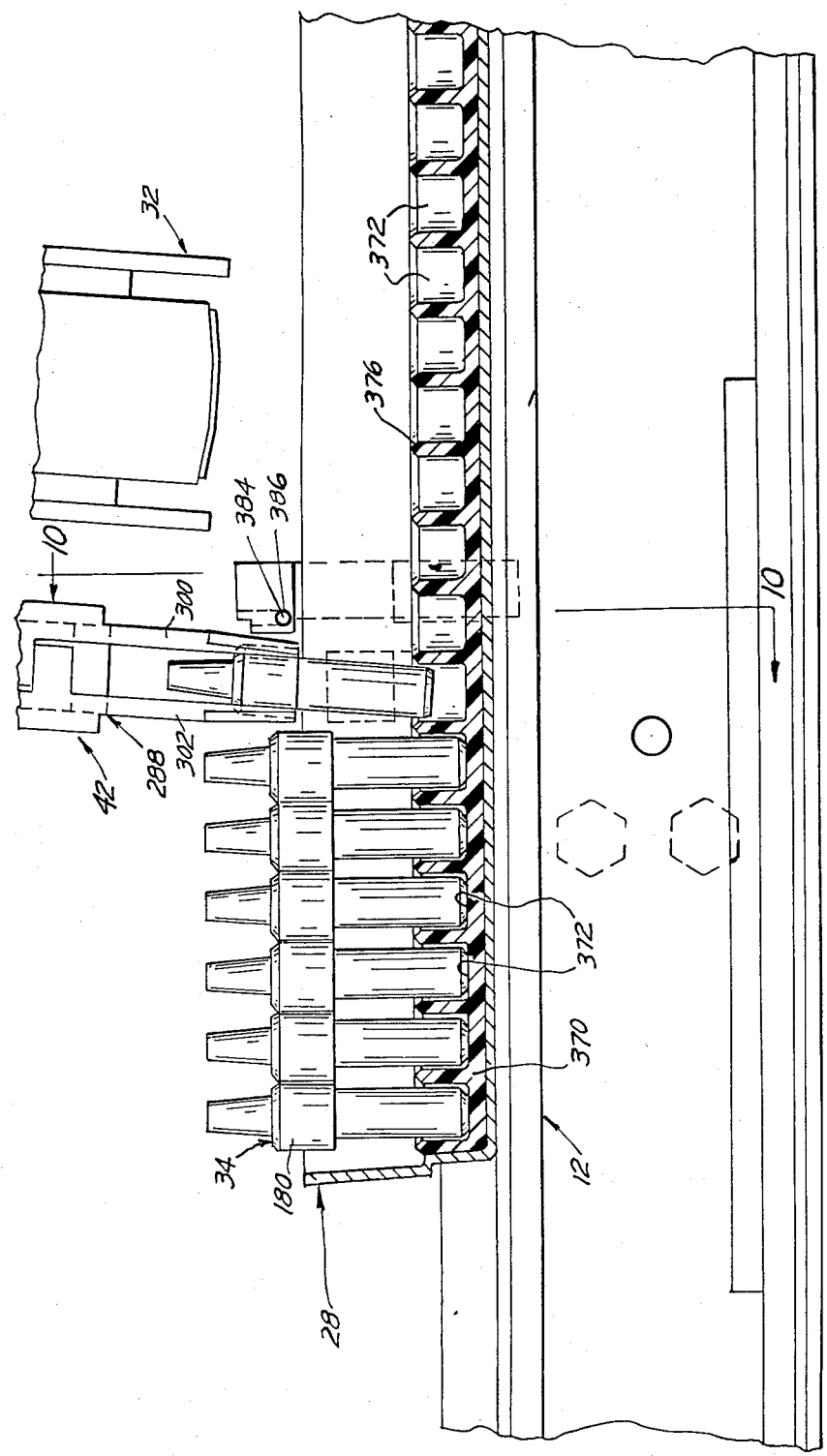

PARTS SENSOR FOR CONVEYOR APPARATUS

CROSS-REFERENCE TO RELATED APPLICATION

The present application is a continuation-in-part of application Ser. No. 479,279, filed Mar. 28, 1983 for Tray Locator and Loader for Conveyor Apparatus, and Method, now U.S. Pat. No. 4,569,183, which is a continuation-in-part of application Ser. No. 456,166 filed Feb. 9, 1983, now U.S. Pat. No. 4,550,551.

BACKGROUND OF THE INVENTION

The present invention relates to a part sensor for a sagger loader and conveyor apparatus in general and more particularly to a part sensor for an apparatus for automatically conveying powder compacted articles or parts from a powder compacting press, or other apparatus, to saggers in which the parts are automatically loaded in a specific order, by rows for example, the saggers being supported by an indexing moving conveyor belt.

Most articles and parts compacted of powder material in a powder compacting press are ultimately loaded in ceramic boats or saggers which are used for conveying the parts through a "firing" or sintering furnace. The parts, prior to sintering, are in a so-called "green" state wherein the particles of powder material are held in adhesion by a binder, and they are therefore relatively fragile.

Safe mechanical handling of such fragile parts presents many problems when the parts are transferred to a loading station, for example, where they are loaded in even rows in saggers and subsequently transported in the saggers to a sintering furnace. In view of the difficulties encountered in handling such fragile parts, manual sorting of the parts and manual loading of the saggers are often the solutions dictated by the necessity of avoiding damaging the parts when in their green and fragile state. The problem of appropriately loading saggers with fragile parts is further complicated by the fact that the parts must be placed in a regular order in the saggers, rather than in bulk at random, sometimes spaced apart, such as to allow the sintering operation to be effected under good conditions, with adequate air or inert gas circulation around the parts, without fusing the parts in a mass, and with even heating and cooling of the parts during travel through the sintering furnace and during any subsequent heat treatment operation, such as quenching for example.

One problem associated with automatic loading of saggers with unsintered powder compacted parts is that it is desirable not to load the sagger with defective or broken parts and, when the parts are loaded in rows in a sagger provided with a bottom tray having cavities for holding the parts in a substantially vertical position, a part may fall over because of incorrect positioning of the part relative to a holding cavity, incorrect dimensioning of the holding cavity, or for any other reason. As the fallen-over part is disposed over empty holding cavities, it prevents further regular loading of the tray in the sagger and may cause further breakage of or damages to the parts.

SUMMARY OF THE INVENTION

The present invention provides a control system for the correct operation of automatic part loaders and part conveyors, which prevents loading the part container or sagger with defective or broken parts, provides automatic rejection of such defective or broken parts, stops the conveyor system and gives an alarm in the event that parts are misplaced in the part sagger and have fallen over rather than being held substantially vertically in a holding tray in the sagger.

The many objects and advantages of the present invention will become apparent to those skilled in the art when the following description of the best mode contemplated for practicing the invention is read in conjunction with the accompanying drawing, wherein like reference numerals refer to like elements, and in which:

BRIEF DESCRIPTION OF THE DRAWING

FIG. 4 is a partial elevation view of a portion thereof from line 4—4 of FIG. 3;

FIG. 5 is an elevation view, partly in section from line 5—5 of FIG. 3 illustrating an example of structure for a part pick-up and loading mechanism;

FIG. 6 is a section thereof along line 6—6 of FIG. 5;

FIG. 7 is a partial view similar to FIG. 6 but showing the part pick-up portion thereof in a part releasing position;

FIG. 8 is a partial schematic top elevation view from line 8—8 of FIG. 5;

FIG. 9 is a schematic longitudinal section through the indexing sagger conveyor portion of the apparatus showing an example of sagger part sensor device;

DETAILED DESCRIPTION OF THE PREFERRED EMBODIMENTS

Figure 1:
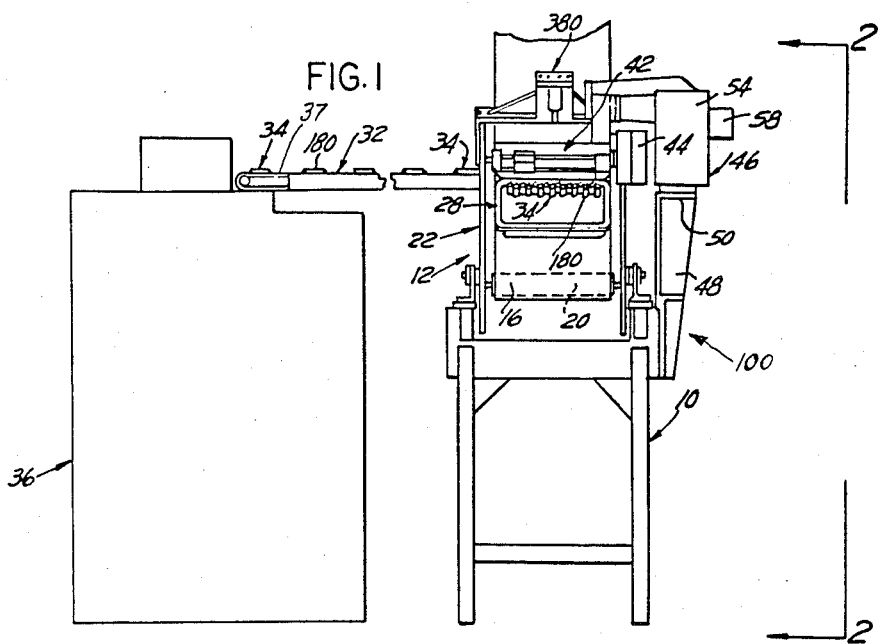
FIG. 1 is a schematic simplified front elevation view of a part sagger loader and conveyor apparatus.
Figure 2:
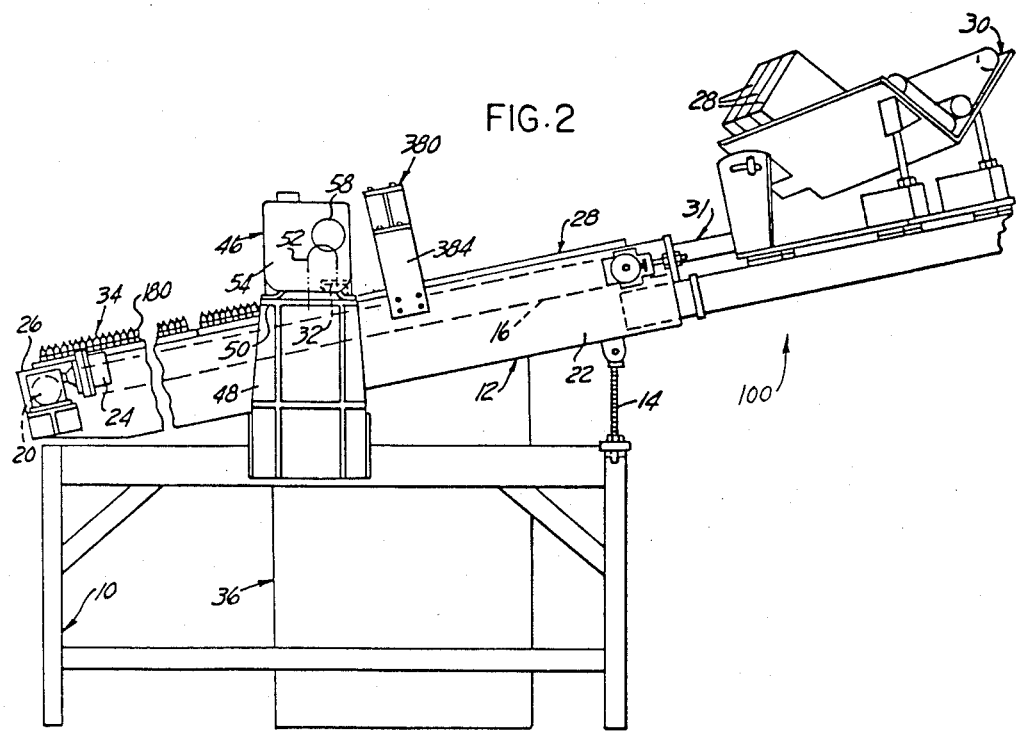
FIG. 2 is a side elevation view thereof from line 2—2 of FIG. 1.
Figure 3:
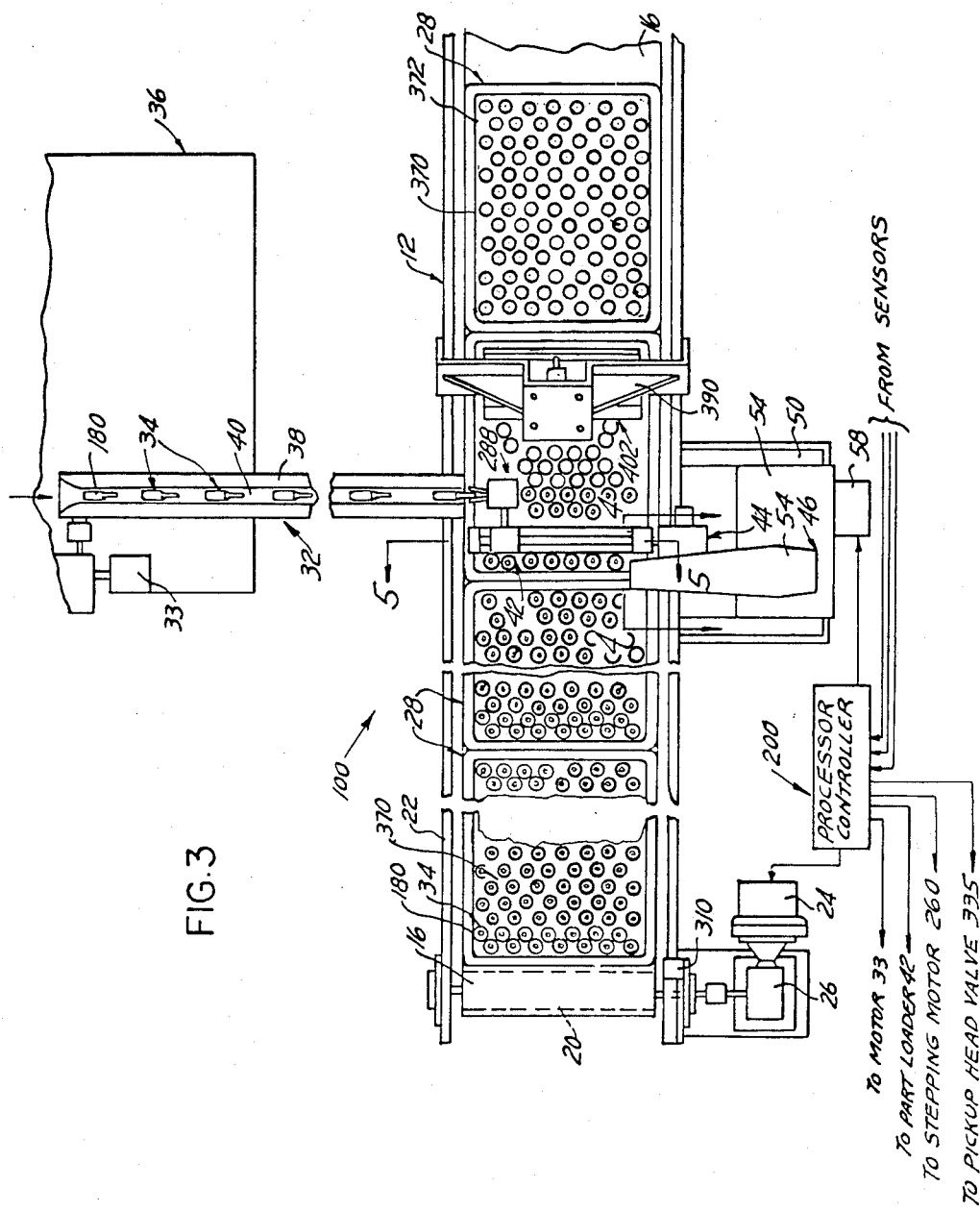
FIG. 3 is a top plan view thereof.

Referring to FIGS. 1–3, a part conveyor and sagger loading apparatus according to the present invention comprises a part conveyor and loader assembly, generally designated at 100, whose operation is entirely automatic, as controlled by a programmable logic processor and controller generally designated at 200, FIG. 3. The part conveyor and loader assembly 100 comprises a frame structure 10 supporting from the ground a sagger conveyor 12. The sagger conveyor 12 is disposed at an angle, and adjustable support pillars 14 are provided for adjustment of the angle of inclination of the sagger conveyor 12. The sagger conveyor 12 comprises an endless belt 16 supported by a free-wheeling drum, not shown, at one end and a power driven drum 20 at the other end, the drums being in turn rotatably supported by a frame 22, as is well known in the art. A stepping electrical motor 24, through a gear reduction drive 26, drives the power driven conveyor drum 20. Appropriate support rollers, or a support, not shown, may be disposed between the sides of the frame 22 below the conveyor belt 16 to provide additional support to the belt 16 and to the load carried by the belt 16.

A plurality of ceramic boats or saggers 28 are stored in a sagger magazine 30, FIG. 2, from which they are transferred one at a time manually or by way of an appropriate automatic loading mechanism 31, forming no part of the present invention.

A part conveyor 32, driven by a geared-down stepping motor 33, is disposed substantially horizontally with its longitudinal axis at a right angle to the longitudinal axis of translation of the sagger conveyor 12. Although the part conveyor 32 may carry "green" powder compacted parts 34 from the parts ejection station of a powder compacting press, the parts 34, in the example of application of the invention illustrated herein, are cylindrical elongated parts, such as spark plug green porcelain insulators, for example, which are ejected from a form grinder 36 adapted to form grind the peripheral shape of the insulator, preferably after compaction of the insulator bodies in an isostatic press or, alternatively, after extrusion through an extrusion die and cutting to length, as is well known in the art, and subsequent drying of the parts prior to form grinding.

The parts 34, after ejection from the form grinder 36, are disposed in a single row on the belt 37 of the conveyor 32. The belt 37 of the part conveyor 32 is covered with a cover or shield 38, FIG. 3, having a slot 40 whose edges act as lateral guides for the row of parts 34. Upon reaching the end of the part conveyor 32, the parts 34 are taken, one at a time, by a pick-up unit 42 mounted on the end of the pivotable elbow-joint arm 44 of a loader 46. The loader 46 is mounted on a support plate 50 attached to the top of a bracket 48 affixed to the side of the conveyor support frame 10. The part pick-up unit 42, mounted on the end of the loader elbow-joint arm 44, engages a single part at a time, and is subsequently lifted by the elbow-joint arm 44 from above the part conveyor 32, displaced laterally along a curve, for example to the left as shown at FIG. 2, and moved vertically along a path arbitrarily represented at FIG. 2 by a phantom line 52 such as to place the part 34 at an appropriate position in a sagger 28 travelling on the sagger conveyor 12. Prior to placement of the part 34 in the sagger 28, the motion of the sagger conveyor belt 16 is stopped as a result of the stepping drive motor 24 having appropriately been momentarily turned off by the processor controller 200, with the sagger 28 correctly indexed for loading of a row of parts 34, for example.

The loader 46, FIGS. 1-3, bolted on the support plate 50 on the top of the side bracket 48 has a housing 54 provided with a bolted down rear plate on which is mounted an electric stepping motor 58, whose operation is controlled by the processor controller 200. The stepping motor 58 drives through an appropriate mechanism, not shown, such as the mechanism described in detail in U.S. Pat. No. 4,550,662, the upper and lower arms 78 and 80 of the elbow-joint arm 44, FIG. 4.

The lower arm 80 supports at its lower end a stub shaft 164 having a projecting portion 168 on which is mounted the part pick-up unit 42, as shown at FIG. 5. The angular position of the stub shaft 164, and therefore of the part pick-up unit 42, remains spatially substantially constant throughout all the motions of the elbow-joint arm 44 from the home or rest position shown at H in phantom line, to the part pick-up position P also shown in phantom line, and to the sagger loading position shown in full line at FIG. 4.

The part pick-up unit 42 of FIGS. 5-7 is adapted to pick up one part 34 at a time from the part conveyor 32, FIGS. 1-3. The part 34 takes the form of an elongate, substantially cylindrical object such as, for example, a spark plug ceramic or porcelain insulator body 180 being picked up from a horizontal position on the part conveyor 32 and being placed vertically in an appropriate order in a row of parts 34 in the sagger 28 on the sagger conveyor 12.

The part pick-up unit 42, FIGS. 5-7, comprises a support block 230 having a longitudinal bore 226 fitted over the projecting portion 168 of the stub shaft 164 at the bottom of the lower arm 80 of the loader elbow-joint arm 44, by one or more setscrews 200 disposed radially. The block 230 is provided with a pair of parallel bores 232 in each of which is affixed the end of one of a pair of rods 234 acting as a support and ways for a slide 236. The slide 236 has a pair of parallel longitudinal bores 238 provided with linear bearings 240 permitting the slide 236 to be smoothly and linearly displaceable along the rods 234. A third rod 250 is fitted in a third bore 252 in the support block 230, and extends longitudinally parallel to the pair of rods 234. A substantially triangular bracing end block 254, FIGS. 5 and 6, is provided with appropriate bores 256, in which are fitted the other ends of the rods 234 and 250 by means such as, for example, transverse setscrews 258, such as to provide a strong, sturdy and rigid assembly for supporting the slide 236.

A stepping motor 260 is bolted below the support block 230, its driveshaft 262 projecting within the block 230 through a bore 264. A cogwheel 266 is mounted on the end of the motor output shaft 262 in a cavity 272 formed in the support block 230. A chain 274 is wrapped around and driven by the motor output cogwheel 266. The chain 274 is also wrapped around a cogwheel 276 mounted on a free-wheeling shaft 277 disposed parallel to the motor output shaft 262 in a cut-out portion 275 in the bracing end block 254. One end of the chain 274 is attached to the slide 236 by a clamp member 278, for example, the other end of the chain being attached to the slide 236 by an adjustable clamp member 278. Each clamp member 278 takes any appropriate shape, and is longitudinally adjustable relative to the slide 236. Appropriate socket screws 279 are provided for locking the clamp members 278 in their adjusted chain-holding position. Alternatively, the chain 274 may be an endless chain attached at some point to the slide 236.

It can be seen that the stepping motor 260, under the control of the processor controller 200, is capable, through the chain 274, of positioning the slide 236 to any appropriate intermediate positions between the support block 230 and the bracing end block 254.

A substantially vertical downwardly extending bracket 280 is fastened to or made integral with the bottom of the slide 236, proximate one side thereof. A rotary actuator 282 is mounted on one side of the bracket 280. The rotary actuator 282 may be a hydraulic rotary actuator, such as a Rotac actuator manufactured by Ex-Cell-O Corp., or an electric stepping motor. The rotary actuator 282 has an output shaft 284 projecting through a bore 286 in the bracket 280 to the other side of the bracket. A part pick-up head 288 is mounted on the end of the positioner shaft 284 by way of a mounting member 290 having a bore 292 through which is passed the end of the shaft 284, and appropriate radially disposed setscrews 294 fastening the mounting member 290 to the positioner shaft 284. The mounting member 290 is integrally formed with, or attached to, a block 296 having a substantially rectangular opening 298. A pair of substantially L-shaped fingers 300 and 302 are pivotally supported in a scissors-like fashion from the block 296, provided for that purpose with a cut-out portion 304 such as to define a pair of legs 306 and 308. Each finger 300 and 302 has a lever end portion, 310 and 312 respectively, projecting into the opening 298 through the cut-out portion 304. The lever end portions 310 and 312 are pivotable one relative to the other by way of a pivot pin 314 passed through aligned appropriate bores proximate the end of each of the block legs 306 and 308 and through appropriate bores in the lever arms 310 and 312. For the purpose of being mutually pivotable, one of the lever arms, lever arm 312 for example, is provided with a cut-out median portion 316 in which is disposed a corresponding lug 318 projecting from the lever arm 312.

A roller 320 is mounted in a recess 322, formed on the interior of the top portion of each of the lever arms 310–312, and is held by a pivot pin 324. Each pivot pin 324 has a projecting portion at each end forming an anchoring means for a garter coil spring or elastomeric ring 326 urging the end of the lever arms 310 and 312 towards each other and the rollers 320 in engagement with the sloping edge surface of a wedge member 328. The wedge member 328 is mounted on the end of a reciprocable linear actuator 330. The reciprocable linear actuator 330, in the structure illustrated, is the piston rod of an air cylinder 332 mounted on the top of the block 296 such that the piston rod-linear actuator 330 projects into the block opening 298. A flexible hose 334 connects the air cylinder 332 to a source of compressed air, not shown, through an appropriate two-way valve 335 operated under the control of the processor controller 200, FIG. 3. The air cylinder 332 may be replaced by an electrical solenoid controlled by the processor controller 200. Downward displacement of the wedge member 328 mounted on the end of the linear actuator 330 spreads apart the lever arms 310 and 312 of the fingers 300 and 302 to the position illustrated at FIG. 6, for grabbing a part 34.

The fingers 300 and 302 have a concave generally cylindrical internal surface portion 336, FIGS. 6 and 7, conforming to the peripheral surface of a spark plug insulator body 180 for grasping a green spark plug insulator body conveyed by the part conveyor 32 when the spark plug insulator body 180 reaches the end of the part conveyor 32, thus, for example, breaking a light beam activating a sensor in the form of a photocell as hereinafter explained in further details which, in turn, controls the operation of the air cylinder 332, via the processor controller 200 and the valve 335, for retracting the wedge member 328. Subsequently, the rotary actuator 282 is activated, simultaneously with activating the stepping motor 260 displacing the slide 236 from the part pick-up position to a part-placing position depositing the spark plug insulator body 180 in a sagger 28 positioned on the sagger conveyor 12, FIGS. 1–3. During travel of the slide 236 from its part pick-up position to its part-placing position, the rotary actuator 282 rotates the part pick-up head 288, such as to rotate the part 34 preferably in the direction of the arrow 338 of FIG. 5 from its horizontal position to a vertical position, shown in phantom line at FIG. 5, around an arc of about 270°. Simultaneously therewith, the drive motor 58 of the loader 46 is activated such as to first raise the part pick-up unit 42 along the path 52 from the part pick-up position to the part-loading position of the part pick-up unit 42. The placement order, in a row in a sagger 28, of the spark plug insulator body 180, in the example of structure and operation herein described, is determined by the distance travelled by the slide 236 as driven by the stepping motor 260, control of the stepping motor 260 being effected by the number of electrical pulses applied to the motor according to an appropriate program stored in an appropriate memory location in the processor controller 200.

The spark plug insulator body 180 is released as a result of opening the fingers 300–302, as shown in FIG. 7, by exhausting fluid from the cylinder 332 via the valve 335, thus causing upward displacement of the wedge member 328 and opening of the fingers 300–302 under the pulling action of the garter spring or elastomeric ring 326.

As best shown at FIG. 5, each finger 300 and 302 of the part pick-up head 288 has a longitudinal slot 340 through which passes a light beam 342, FIG. 8, emitted by a light beam producing unit 343 such as an LED, mounted on one side of the part conveyor 32 at the end thereof, when the part pick-up head 288 is in the part pick-up position illustrated at FIG. 5 for picking up a part such as a spark plug insulator 180 at the end of the part conveyor 32. The light beam 342, passing through the finger slots 340 and directed substantially perpendicular to the axis of travel of the part conveyor 32, impinges upon a light sensor 344, such as a photocell or the like, mounted on the other side of the part conveyor 32 in alignment with the light beam producing unit 343. When the light beam 342 is masked by the tip of the part which, in the example of application illustrated, is a spark plug insulator body 180, a signal appears at the output of the light sensor 344. A second pair of light beam emitter 346 and light sensor 348 cooperate in such manner that a second light beam 350 emitted by the light emitter 346, directed substantially parallel to the light beam 342, remains interrupted if the spark plug insulator body 180 is substantially of the proper length, i.e. has neither a tip or a butt broken off, and the signals applied by the light sensors 344 and 348 to the processor controller 200 are processed such as to provide a control signal causing the valve 335 to operate the cylinder 332 to close the fingers 300 and 302 for grasping the spark plug insulator body 180. In the event that either the tip or the butt of the spark plug insulator body 180 is broken off, the light beam 342 is interrupted simultaneously with the light beam 350, after a short interruption due to the passage of the spark plug insulator body 180, impinging on the light sensor 348 and the signals supplied by the sensors 344 and 348 are processed in the processor controller 200, FIG. 3, to act in such manner as to prevent the closing of the fingers 300–302 of the part pick-up head 288 by leaving the valve 335, FIGS. 5–7, closed, with the result that the defective spark plug insulator body 180 continues travelling on the conveyor belt 37 of the part conveyor 32 until it drops into a reject bin, not shown.

As previously mentioned, the parts 34, namely the green spark plug insulator bodies 180, are placed in the saggers 28 on the sagger conveyor 12 one at a time in consecutive rows, each in a vertical position. For that purpose, each sagger 28 contains a styrofoam insert or tray 370, as best shown at FIGS. 9–12, provided with a plurality of part-holding cavities 372 nesting the end of each spark plug insulator body 180 such that the spark plug insulator cylindrical bodies 180 are held in a vertical position in consecutive staggered rows. The part-holding cavities 372 in the styrofoam insert 370 are cylindrical, equi-distant from each other, and of a size adapted to snuggly accept the cylindrical end of each spark plug insulator body 180. Each styrofoam insert 370 fits in a sagger 28 with a narrow lateral clearance, permitting to precisely locate the insert 370 within the sagger 28. Each cavity 372 is tapered at its open end, as shown at 376, to facilitate introduction thereon of the end of the insulator body 180.

A positioner 380, FIGS. 1–3, is mounted over the sagger conveyor 12 for the purpose of locating the styrofoam inserts 370 in the saggers 28. As disclosed in detail in U.S. Pat. No. 4,553,375 assigned to the same assignee as the present application, the positioner 380, through appropriate plungers, not shown, further permits to relocate and resize the part-holding cavities 372 in the styrofoam insert 370, if necessary.

Figure 10:
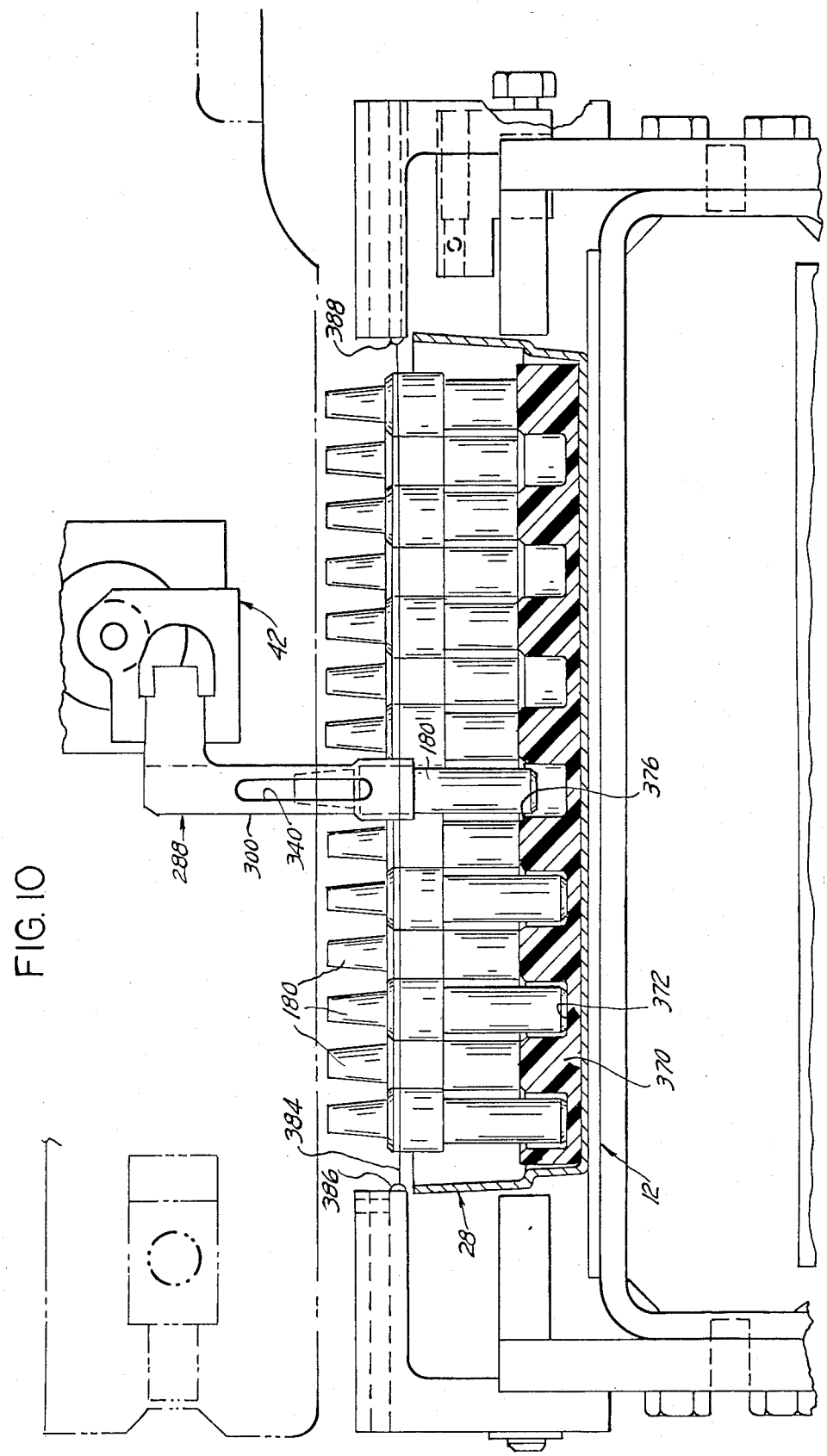
FIG. 10 is a transverse section substantially along line 10—10 of FIG. 9.

Referring now to FIGS. 9–10, a narrow light beam 384, produced by a light emitter 386 mounted on one side of the sagger conveyor 12, is aimed at a sensor 388, FIG. 10, mounted on the other side of the conveyor 12. As shown more particularly at FIG. 9, when the sagger conveyor 12 indexes the sagger 28 at an appropriate position for loading of a spark plug insulator body 180 in an appropriate part-holding cavity 372 in a row of cavities in the insert 370, the light beam 384 is aimed from one side of the sagger conveyor 12 to the other above the edge of the sagger 28, transversely substantially in alignment with the next empty row of part-holding cavities 372. The spark plug insulator bodies 180 already properly loaded in the preceding row of part-holding cavities 372 of the insert 370 remain erected substantially vertically, clear of the light beam 384. However, if in the course of loading, one spark plug insulator body 180 already loaded is knocked over by the part pick-up head 288, or the fingers 300–302, or a spark plug insulator body 180 being presently loaded by the part pick-up head 288 falls over, it can fall over only towards the next empty row, thus interrupting, at least momentarily, the light beam 384. The signal at the output of the sensor 388 is, via the processor controller 200, used to stop further loading of parts and to ring an alarm to call an operator's attention to the malfunction.

Figure 11:
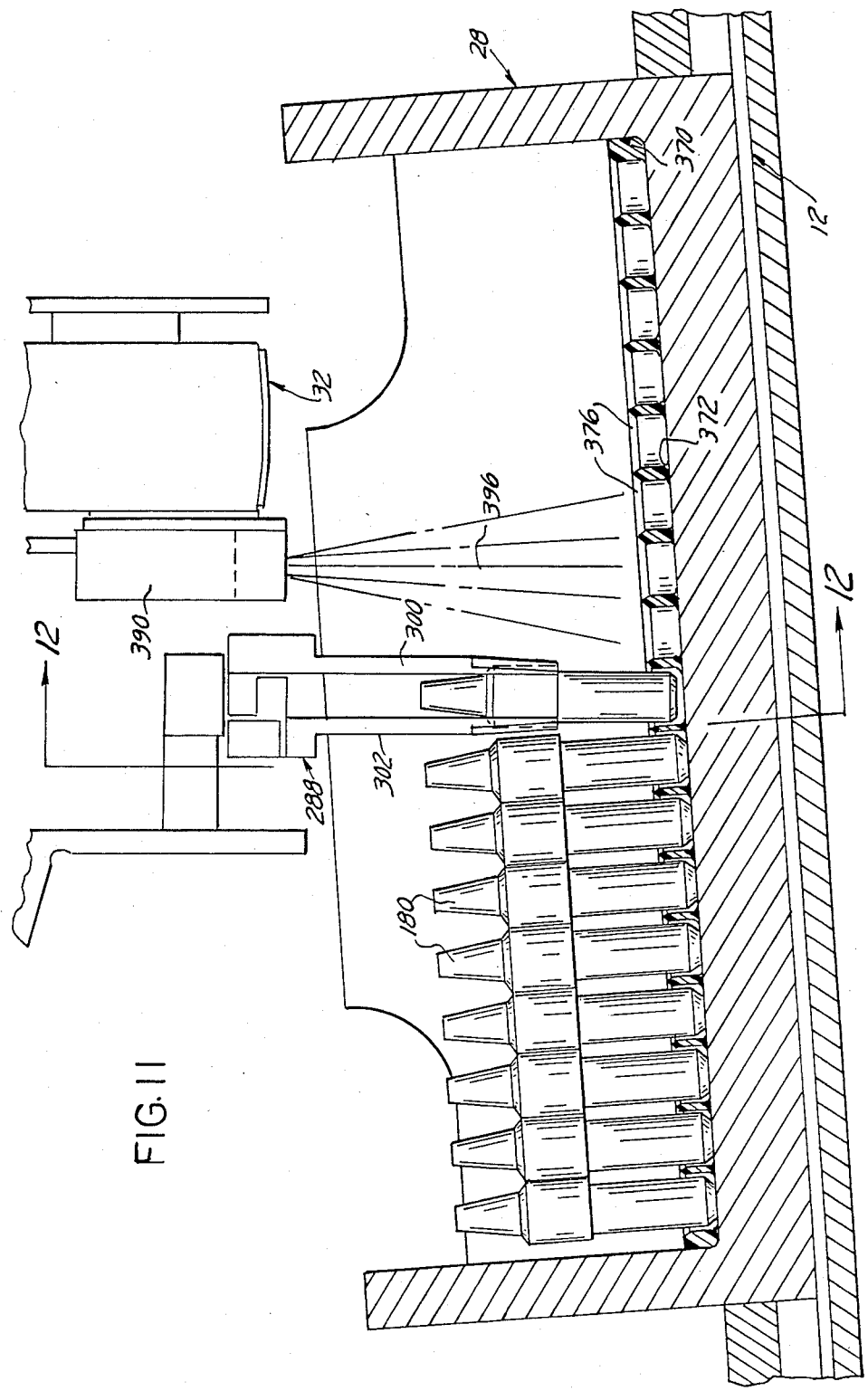
FIG. 11 is a view similar to FIG. 9 but showing a modification thereof.
Figure 12:
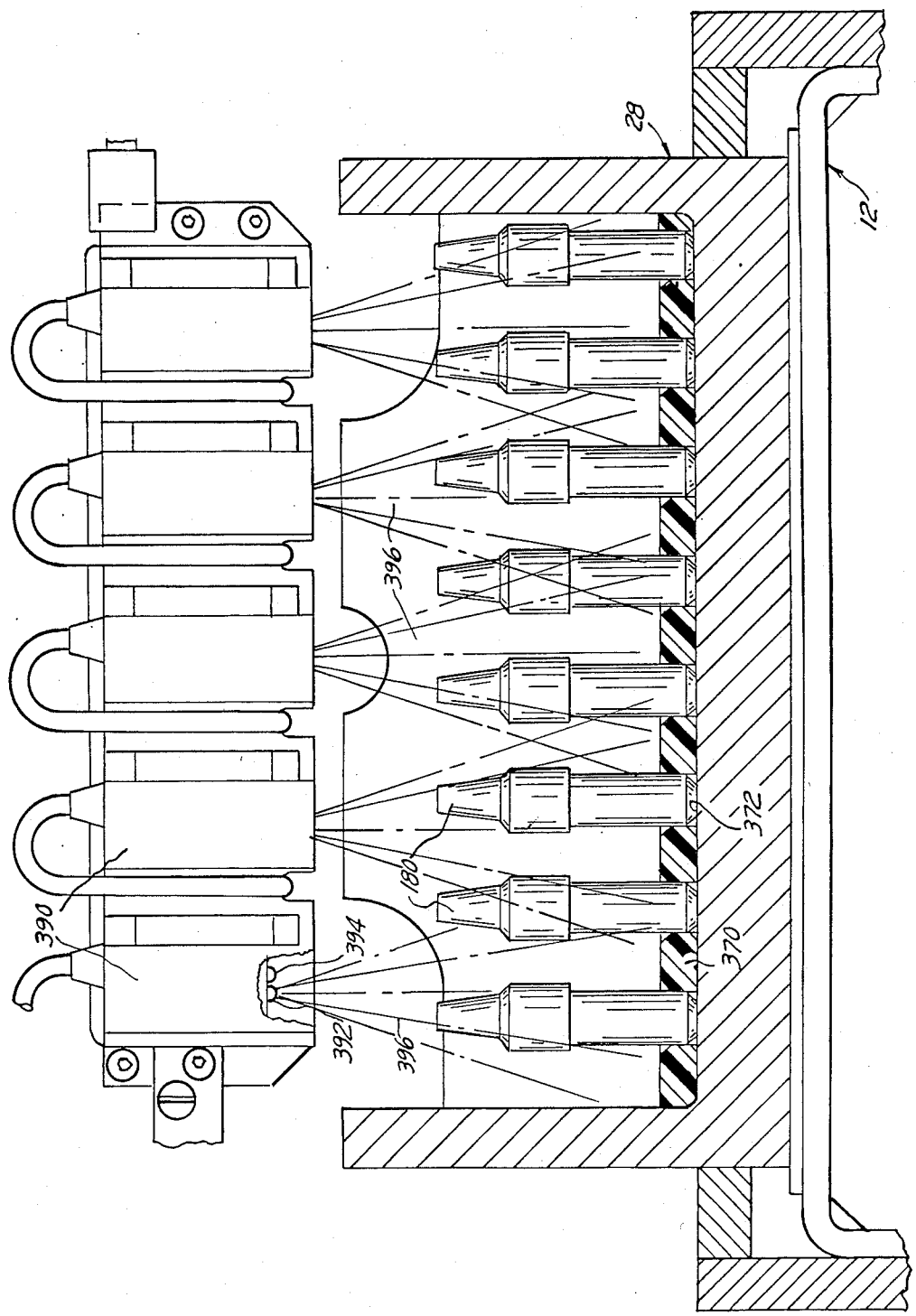
FIG. 12 is a transverse section substantially along line 12—12 of FIG. 11.

FIGS. 11–12 illustrate schematically an alternate arrangement for detecting fallen over parts, more particularly in structures where the sagger, as the one shown at 28 at FIGS. 11 and 12, has relatively high sidewalls, generally higher than the parts such as spark plug insulator bodies 180. A plurality of light beam emitting and sensor units 390 are mounted at an appropriate location over the sagger conveyor 12, such as by being attached to one side of the frame of the part conveyor 32. Each unit 390, as best shown at FIG. 12, has a light beam emitter 392 on its bottom cooperating with a light sensor 394 shielded from ambient light. The light beam emitter 392 of each light beam emitting and sensing unit 390 produces a relatively wide curtain 396 of light, which is directed substantially along a row of part holding cavities 372 in the insert 370, relatively close to the row of cavities 372 being loaded by the part pick-up head 288. The material of the styrofoam tray insert 370 is of a dark color such as mat black, with the result that no reflection of the light emitted by the light emitter 392 impinges on any one of the light sensors 394, unless a spark plug insulator body 180, which is made of a material which even in its "green" state is generally grayish-white, has fallen over in the light curtain 396 and has reflected enough light to activate one of the light sensors 394. Upon activation of one of the light sensors 394, an alarm is triggered and the operation of the machine stopped momentarily until proper measures have been taken by the operator to rectify the cause of the malfunction.

The operation of the apparatus of the invention is automatic. Diverse sensors, in the form of pressure switches, limit switches, proximity switches and light beam activated photoelectric sensors are disposed at appropriate locations along the sagger conveyor 12, FIGS. 1–3, and the part conveyor 32, to regulate the flow of parts 34 on the part conveyor 32, and to coordinate, via the processor controller 200, the operation of the loader 46 to load the saggers 28 with parts 34 in an appropriate order.

The operation of the stepping motor 33 driving the part conveyor 32 is similarly subjected to the control of appropriate sensors detecting the presence of parts at diverse locations along the conveyor 32. For example, a sensor installed at the inlet of the part conveyor 32 detects the presence of parts being loaded on the conveyor. One or more jam detectors detects the presence or absence of parts at chosen locations along the part conveyor 32 and are arranged to cause the processor controller 200 to either sound an alarm or stop the operation of the apparatus, or both, in the event of malfunction.

In arrangements where a single part 34, such as a spark plug insulator body 180, is loaded from the part conveyor 32 onto the sagger 28, the part presence sensor at the end of the part conveyor 32 formed by the light sensors 344 and 348, FIG. 8, activates the beginning of the operation of the loader 46 and part pick-up unit 42 by the processor controller 200. Knowing how many parts are to be placed in a row of the tray insert 370 in the sagger 28, for example as stored in a memory location of the processor controller 200, FIG. 3, the slide stepping motor 260 of the part pick-up unit 42 of FIGS. 5–7 is operated such as to locate the slide 236 and part pick-up head 288 along the slide ways to an appropriate position corresponding to the order of the single part being loaded in a row in the sagger tray insert 270. The slide stepping motor 260 may be operated under the control of a counter that counts each part being placed in a row in the sagger tray insert 370, under the control of the programmed processor controller 200.

Appropriate sensors may be disposed at appropriate locations to determine the presence of parts being actually loaded at the inlet end of the part conveyor 32 to detect jams, to count parts, to check parts, to count the rows of parts being actually loaded in the sagger tray insert 370, etc. When a full row of parts has been loaded in a tray insert, the sagger conveyor motor 24 is activated to advance the conveyor belt 16 a distance corresponding to the distance separating consecutive rows. All the functions, such as counting parts loaded in a row, indexing to the next row, indexing to the next sagger, etc., are made under the control of an appropriate program stored in the electronic controller processor 200, and under the control of appropriate sensor feed-back signals fed to the controller processor 200.

Having thus described the present invention by way of examples of structure well adapted to accomplish the purpose of the invention, modifications whereof will be apparent to those skilled in the art, what is claimed as new is as follows:

1. An apparatus for transferring elongated parts from one conveyor to another, said apparatus comprising a first conveyor for carrying a single row of parts travelling along a first axis of travel, a second conveyor for a receptacle travelling along a second axis of travel at an angle to said first axis of travel, part pick-up and loading means disposed in a location where said first axis of travel and said second axis of travel intersect, said part pick-up and loading means being adapted to picking parts sequentially at the end of said first conveyor for vertical placement of a single part in a predetermined order in said receptacle on said second conveyor, first sensor means detecting a part reaching a location at an end of said first conveyor for pick-up by said part pick-up and loading means, means controlling the operation of said part pick-up and loading means when said first sensor means detects a part at said location, second sensor means for determining length integrity of said part at said location, and means inhibiting the operation of said part pick-up and loading means in the event that said part at said location has a length less than a predetermined length, said first sensor means and said second sensor means each comprising a radiation beam emitter disposed on one side of said first conveyor projecting a radiation beam across said first conveyor proximate the end thereof and a radiation beam detector disposed on the other side of said first conveyor for impingement thereon of said radiation beam, and said part pick-up and loading means comprising a pair of finger members operable for grasping a part therebetween, and an aperture through each of said fingers aligning with said radiation beam of said first sensor means.

2. An apparatus for transferring elongated parts from one conveyor to another, said apparatus comprising a first conveyor for carrying a single row of parts travelling along a first axis of travel, a second conveyor for a receptacle travelling along a second axis of travel at an angle to said first axis of travel, part pick-up and loading means disposed in a location where said first axis of travel and said second axis of travel intersect, said part pick-up and loading means being adapted to picking parts sequentially at the end of said first conveyor for vertical placement of a single part in a predetermined order in a predetermined row in said receptacle on said second conveyor, first sensor means detecting a part reaching a location at an end of said first conveyor for pick-up by said part pick-up and loading means, means controlling the operation of said part pick-up and loading means when said first sensor means detects a part at said location, second sensor means for determining length integrity of said part at said location, and means inhibiting the operation of said part pick-up and loading means in the event that said part at said location has a length less than a predetermined length, third sensor means for detecting misplacement of a part in said receptacle on said second conveyor, said third sensor means comprising a radiation beam emitter disposed on one side of said second conveyor for emitting an energy beam across said second conveyor, a radiation beam detector disposed on the other side of said second conveyor for impingement thereon of said radiation beam, said radiation beam emitter and detector being located such that said beam has a trajectory substantially along a next consecutive row of parts to be loaded in said receptacle, whereby a falling over part in a next preceding row interrupts said radiation beam.

3. An apparatus for transferring elongated parts from one conveyor to another, said apparatus comprising a first conveyor for carrying a single row of parts travelling along a first axis of travel, a second conveyor for a receptacle travelling along a second axis of travel at an angle to said first axis of travel, part pick-up and loading means disposed in a location where said first axis of travel and said second axis of travel intersect, said part pick-up and loading means being adapted to picking parts sequentially at the end of said first conveyor for vertical placement of a single part in a predetermined order in a predetermined row in said receptacle on said second conveyor, first sensor means detecting a part reaching a location at an end of said first conveyor for pick-up by said part pick-up and loading means, means controlling the operation of said part pick-up and loading means when said first sensor means detects a part at said location, second sensor means for determining length integrity of said part at said location, and means inhibiting the operation of said part pick-up and loading means in the event that said part at said location has a length less than a predetermined length, said first sensor means and said second sensor means each comprising a radiation beam emitter disposed on one side of said first conveyor projecting a radiation beam across said first conveyor procimate the end thereof and a radiation beam detector disposed on the other side of said first conveyor for impingement thereon of said radiation beam, sensor means for detecting misplacement of a part on said receptacle on said second conveyor, said third sensor means comprising a radiation beam emitter disposed on one side of said second conveyor for emitting an energy beam across said second conveyor, a radiation beam detector disposed on the other side of said second conveyor for impingement thereon of said radiation beam, said radiation beam emitter and detector being located such that said beam has a trajectory substantially along a next consecutive row of parts to be loaded in said receptacle, whereby a falling over part in a next preceding row interrupts said radiation beam.

4. An apparatus for transferring elongated parts from one conveyor to another, said apparatus comprising a first conveyor for carrying a single row of parts travelling along a first axis of travel, a second conveyor for a receptacle travelling along a second axis of travel at an angle to said first axis of travel, part pick-up and loading means disposed in a location where said first axis of travel and said second axis of travel intersect, said part pick-up and loading means being adapted to picking parts sequentially at the end of said first conveyor for vertical placement of a single part in a predetermined order in a predetermined row in said receptacle on said second conveyor, first sensor means detecting a part reaching a location at an end of said first conveyor for pick-up by said part pick-up and loading means, means controlling the operation of said part pick-up and loading means when said first sensor means detects a part at said location, second sensor means for determining length integrity of said part at said location, and means inhibiting the operation of said part pick-up and loading means in the event that said part at said location has a length less than a predetermined length, third sensor means for detecting misplacement of a part in said receptacle on said second conveyor, said third sensor means comprising a plurality of radiation beam emitters disposed above said second conveyor, said radiation beam emitters producing a radiation curtain directed into said receptacle along a next consecutive row of parts to be loaded, and radiation sensors detecting reflection of a portion of said radiation curtain by a falling over part from a next preceding row.

5. An apparatus for transferring elongated parts from one conveyor to another, said apparatus comprising a first conveyor for carrying a single row of parts travelling along a first axis of travel, a second conveyor for a receptacle travelling along a second axis of travel at an angle to said first axis of travel, part pick-up and loading means disposed in a location where said first axis of travel and said second axis of travel intersect, said part pick-up and loading means being adapted to picking parts sequentially at the end of said first conveyor for vertical placement of a single part in a predetermined order in a predetermined row in said receptacle on said second conveyor, first sensor means detecting a part reaching a location at an end of said first conveyor for pick-up by said part pick-up and loading means, means controlling the operation of said part pick-up and loading means when said first sensor means detects a part at said location, second sensor means for determing length integrity of said part at said location, and means inhibiting the operation of said part pick-up and loading means in the event that said part at said location has a length less than a predetermined length, said first sensor means and said second sensor means each comprising a radiation beam emitter disposed on one side of said first conveyor projecting a radiation beam across said first conveyor proximate the end thereof and a radiation beam detector disposed on the other side of said first conveyor for impingement thereon of said radiation beam, a third sensor means for detecting misplacement of a part in said receptacle on said conveyor, said third sensor means comprising a plurality of radiation beam emitters disposed said second conveyor, said radiation beam emitters producing a radiation curtain directed into said receptacle along a next consecutive row of parts to be loaded, and radiation sensors detecting reflection of a portion of said radiation curtain by a falling over part from a next preceding row.

6. An apparatus for transferring elongated parts from one conveyor to another, said apparatus comprising a first conveyor for carrying a single row of parts travelling along a first axis of travel, a second conveyor having a receptacle travelling along a second axis of travel at an angle to said first axis of travel, part pick-up and loading means disposed at a location where said first axis of travel and said second axis of travel intersect, said part pick-up and loading means being adapted to picking parts sequentially at the end of said first conveyor for individual placement of a single part in a vertical position in a predetermined order in a predetermined row in said receptacle on said second conveyor, and sensor means for detecting a fallen-over part in said receptacle, said sensor means comprising a radiation beam emitter disposed on one side of said second conveyor for emitting an energy beam across said second conveyor, a radiation beam detector disposed on the other side of said second conveyor for impingement thereon of said radiation beam, said radiation beam emitter and detector being located such that said beam has a trajectory substantially along a next consecutive row of parts to be loaded in said receptacle, whereby a falling over part in a next preceding row interrupts said radiation beam.

7. An apparatus for transferring elongated parts from one conveyor to another, said apparatus comprising a first conveyor for carrying a single row of parts travelling along a first axis of travel, a second conveyor having a receptacle travelling along a second axis of travel at an angle to said first axis of travel, part pick-up and loading means disposed at a location where said first axis of travel and said second axis of travel intersect, said part pick-up and loading means being adapted to picking parts sequentially at the end of said first conveyor for individual placement of a single part in a vertical position in a predetermined order in a predetermined row in said receptacle on said second conveyor, and sensor means for detecting a fallen-over part in said receptacle, said sensor means comprises a plurality of radiation beam emitters disposed above said second conveyor, said radiation beam emitters producing a radiation curtain directed into said receptacle along a next consecutive row of parts to be loaded, and radiation sensors detecting reflection of a portion of said radiation curtain by a falling over part from a next preceeding row.

8. A method for transferring elongated parts from one conveyor to another, said method comprising carrying a single row of parts on a first conveyor travelling along a first axis of travel, carrying a receptacle on a second conveyor travelling along a second axis of travel at an angle to said first axis of travel, picking up parts sequentially at the end of said first conveyor and loading said parts substantially vertically each in a predetermined order in a predetermined row in said receptacle on said second conveyor, detecting a part reaching a pick-up location at an end of said first conveyor, controlling the operation of a part pick-up and loading means upon detection of a part reaching said pick-up location, determining the length of said part at said pick-up location, and inhibiting the operation of said part pick-up and loading means in the event that said part at said pick-up location has a length less than a predetermined length and detecting misplacement of a part in said receptacle on said second conveyor comprising projecting a radiation beam from an emitter disposed on one side of said second conveyor across said second conveyor into a radiation beam detector disposed on the other side of said second conveyor, said radiation beam having a trajectory substantially along a next consecutive row of parts to be loaded in said receptacle, whereby a falling over part in a next preceding row interrupts said radiation beam.

9. A method for transferring elongated parts from one conveyor to another, said method comprising carrying a single row of parts on a first conveyor travelling along a first axis of travel, carrying a receptacle on a second conveyor travelling along a second axis of travel at an angle to said first axis of travel, picking up parts sequentially at the end of said first conveyor and loading said parts substantially vertically each in a predetermined order in a predetermined row in said receptacle on said second conveyor, detecting a part reaching a pick-up location at an end of said first conveyor, controlling the operation of a part pick-up and loading means upon detection of a part reaching said pick-up location, determining the length of said part at said pick-up location, and inhibiting the operation of said part pick-up and loading means in the event that said part at said pick-up location has a length less than a predetermined length, detecting misplacement of a part in said receptacle on said second conveyor comprising projecting a radiation beam from an emitter disposed on one side of said second conveyor across said second conveyor into a radiation beam detector disposed on the other side of said second conveyor, said radiation beam having a trajectory substantially along a next consecutive row of parts to be loaded in said receptacle, whereby a falling over part in a next preceding row interrupts said radiation beam.

10. A method for transferring elongated parts from one conveyor to another, said method comprising carrying a single row of parts on a first conveyor travelling along a first axis of travel, carrying a receptacle on a second conveyor travelling along a second axis of travel at an angle to said first axis of travel, picking up parts sequentially at the end of said first conveyor and loading said parts substantially vertically each in a predetermined order in a predetermined row in said receptacle on said second conveyor, detecting a part reaching a pick-up location at an end of said first conveyor, controlling the operation of a part pick-up and loading means upon detection of a part reaching said pick-up location, determining the length of said part at said pick-up location, and inhibiting the operation of said part pick-up and loading means in the event that said part at said pick-up location has a length less than a predetermined length, detecting a part reaching said pick-up location comprising projecting a radiation beam from an emitter disposed on one side of said first conveyor approximate the end into a radiation beam detector disposed on the other side of said conveyor, detecting misplacement of a part in said receptacle on said second conveyor comprising projecting a radiation beam from an emitter disposed on one side of said second conveyor across said second conveyor into a radiation beam detector disposed on the other side of said second conveyor, said radiation beam having a trajectory substantially along a next consecutive row of parts to be loaded in said receptacle, whereby a falling over part in a next preceding row interrupts said radiation beam.

11. A method for transferring elongated parts from one conveyor to another, said method comprising carrying a single row of parts on a first conveyor travelling along a first axis of travel, carrying a receptacle on a second conveyor travelling along a second axis of travel at an angle to said first axis of travel, picking up parts sequentially at the end of said first conveyor and loading said parts substantially vertically each in a predetermined order in a predetermined row in said receptacle on said second conveyor, detecting a part reaching a pick-up location at an end of said first conveyor, controlling the operation of a part pick-up and loading means upon detection of a part reaching said pick-up location, determining the length of said part at said pick-up location, and inhibiting the operation of said part pick-up and loading means in the event that said part at said pick-up location has a length less than a predetermined length, detecting a part reaching said pick-up location comprising projecting a radiation beam from an emitter disposed on one side of said first conveyor proximate the end into a radiation beam detector disposed on the other side of said first conveyor, determining the length of said part at said pick-up location comprising projecting a second radiation beam from a second emitter disposed on one side of said first conveyor into a second radiation beam detector disposed in the other side of said first conveyor, said first-mentioned beam and said second beam being substantially parallel and spaced apart a distance substantially equal to a predetermined length of said part, detecting misplacement of a part in said receptacle on said second conveyor comprising projecting a radiation beam from an emitter disposed on one side of said second conveyor across said second conveyor into a radiation beam detector disposed on the other side of said second conveyor, said radiation beam having a trajectory substantially along a next consecutive row of parts to be loaded in said receptacle, whereby a falling over part in a next preceding row interrupts said radiation beam.

12. A method for transferring elongated parts from one conveyor to another, said method comprising carrying a single row of parts on a first conveyor travelling along a first axis of travel, carrying a receptacle on a second conveyor travelling along a second axis of travel at an angle to said first axis of travel, picking up parts sequentially at the end of said first conveyor and loading said parts substantially vertically each in a predetermined order in a predetermined row in said receptacle on said second conveyor, detecting a part reaching a pick-up location at an end of said first conveyor, controlling the operation of a part pick-up and loading means upon detection of a part reaching said pick-up location, determining the length of said part at said pick-up location, and inhibiting the operation of said part pick-up and loading means in the event that said part at said pick-up location has a length less than a predetermined length, detecting misplacement of a part in said receptacle on said second conveyor comprising producing a radiation curtain directed into said receptacle along a next consecutive row of parts to be loaded, and detecting reflection of a portion of said radiation curtain by a falling over part from a next preceding row.

13. A method for transferring elongated parts from one conveyor to another, said method comprising carrying a single row of parts on a first conveyor travelling along a first axis of travel, carrying a receptacle on a second conveyor travelling along a second axis of travel at an angle to said first axis of travel, picking up parts sequentially at the end of said first conveyor and loading said parts substantially vertically each in a predetermined order in a predetermined row in said receptacle on said second conveyor, detecting a part reaching a pick-up location at an end of said first conveyor, controlling the operation of a part pick-up and loading means upon detection of a part reaching said pick-up location, determining the length of said part at said pick-up location, and inhibiting the operation of said part pick-up and loading means in the event that said part at said pick-up location has a length less than a predetermined length, detecting a part reaching said pick-up location comprising projecting a radiation beam from an emitter disposed on one side of said first conveyor proximate the end into a radiation beam detector disposed on the other side of said first conveyor and detecting misplacement of a part in said receptacle on said second conveyor comprising producing a radiation curtain directed into said receptacle along a next consecutive row of parts to be loaded, and detecting reflection of a portion of said radiation curtain by a falling over part from a next preceding row.

14. A method for transferring elongated parts from one conveyor to another, said method comprising carrying a single row of parts on a first conveyor travelling along a first axis of travel, carrying a receptacle on a second conveyor travelling along a second axis of travel at an angle to said first axis of travel, picking up parts sequentially at the end of said first conveyor and loading said parts substantially vertically each in a predetermined order in a predetermined row in said receptacle on said second conveyor, detecting a part reaching a pick-up location at an end of said first conveyor, controlling the operation of a part pick-up and loading means upon detection of a part reaching said pick-up location, determining the length of said part at said pick-up location, and inhibiting the operation of said part pick-up and loading means in the event that said part at said pick-up location has a length less than a predetermined length, detecting a part reaching said pick-up location comprising projecting a radiation beam from an emitter disposed on one side of said first conveyor proximate the end into a radiation beam detector disposed on the other side of said first conveyor, determining the length of said part at said pick-up location comprising projecting a second radiation beam from a second emitter disposed on one side of said first conveyor into a second radiation beam detector disposed in the other side of said first conveyor, said first-mentioned beam and said second beam being substantially parallel and spaced apart a distance substantially equal to a predetermined length of said part, and detecting misplacement of a part in said receptacle on said second conveyor comprising producing a radiation curtain directed into said receptacle along a next consecutive row of parts to be loaded, and detecting reflection of a portion of said radiation curtain by a falling over part from a next preceding row.

15. A method for transferring elongated parts from one conveyor to another, said method comprising carrying a single row of parts on a first conveyor travelling along a first axis of travel, carrying a receptacle on a second conveyor travelling along a second axis of travel at an angle to said first axis of travel, picking up parts sequentially at a location where said first axis of travel and said second axis of travel intersect, loading said parts sequentially and individually in a predetermined order in a predetermined row in said receptacle on said second conveyor in a substantially vertical position, and detecting a fallen-over part in said receptacle comprising directing a radiation beam across said second conveyor substantially along a next consecutive row of parts to be loaded in said receptacle, whereby a falling over part in a next preceding row interrupts said radiation beam.

16. A method for transferring elongated parts from one conveyor to another, said method comprising carrying a single row of parts on a first conveyor travelling along a first axis of travel, carrying a receptacle on a second conveyor travelling along a second axis of travel at an angle to said first axis of travel, picking up parts sequentially at a location where said first axis of travel and said second axis of travel intersect, loading said parts sequentially and individually in a predetermined order in a predetermined row in said receptacle on said second conveyor in a substantially vertical position.

* * * * *